United States Patent [19]

Winter et al.

[11] Patent Number: 4,840,461

[45] Date of Patent: Jun. 20, 1989

[54] OPTICAL SWITCHING DEVICES HAVING LIQUID CRYSTAL WITH SPLAYED MOLECULAR ORIENTATION

[75] Inventors: Christopher S. Winter; Raman Kashyap, both of Ipswich, England

[73] Assignee: British Telecommunications public limited company, United Kingdom

[21] Appl. No.: 103,734

[22] Filed: Oct. 2, 1987

[30] Foreign Application Priority Data

Oct. 7, 1986 [GB] United Kingdom ................. 8624071
Jan. 20, 1987 [GB] United Kingdom ................. 8701174

[51] Int. Cl.$^4$ .......................... G02F 1/13; G02B 6/42; H01P 1/10
[52] U.S. Cl. ................................ 350/346; 350/331 R; 350/336; 350/340; 350/341; 350/347 V; 350/96.15
[58] Field of Search .................. 350/336, 346, 347 V, 350/340, 341, 355, 337, 96.15

[56] References Cited

U.S. PATENT DOCUMENTS

| | | | |
|---|---|---|---|
| 3,674,342 | 7/1972 | Castellano et al. | 350/336 |
| 3,918,794 | 11/1975 | Milton | 350/347 R |
| 4,201,442 | 5/1980 | McMahon et al. | 350/347 V |
| 4,243,295 | 1/1981 | Alferness | 350/355 |
| 4,247,174 | 1/1981 | Walter | 350/340 |
| 4,333,708 | 6/1982 | Boyd et al. | 350/340 |
| 4,563,059 | 1/1986 | Clark et al. | 350/330 |
| 4,566,758 | 1/1986 | Bos | 350/346 |
| 4,643,528 | 2/1987 | Bell, Jr. | 350/344 |
| 4,720,174 | 1/1988 | Baker | 350/347 V |
| 4,721,352 | 1/1988 | Sorin et al. | 350/337 |
| 4,749,258 | 6/1988 | Baker | 350/347 V |

FOREIGN PATENT DOCUMENTS 0204537 12/1986 European Pat. Off. ........ 350/350 S
0204824 11/1984 Japan ............................. 428/1

OTHER PUBLICATIONS

Applied Physics, vol. 48, No. 1, Jan. 1986, pp. 10-12, American Institute of Physics, New York, US; E. S. Goldburt et al: "Electro-Optical Response of a Liquid-Crystalline Fiber Coupler", pp. 10-12, FIG. 1.
Optics Letters, vol. 11, No. 3, Mar. 1986, pp. 180-182, New York, US; K. Liu et al: "Single-Mode-Fiber Evanescent Polarizer/Amplitude Modulator Using Liquid Crystals", pp. 180-182, FIG. 1.
Applied Physics Letters, vol. 42, No. 4, Feb. 1983, pp. 322-324, American Institute of Physics, New York, US; V. I. Busurin et al: "Switchable Coaxial Optical Coupler Using a Liquid Crystal Mixture", pp. 322-324, FIG. 1.
Ludeman et al—"Liquid Crystal Cell Having Nonuniform Thickness", IBM Technical Disclosure Bulletin—vol. 15, No. 4—Sep. 1972—pp. 1349-1350.

Primary Examiner—Stanley D. Miller
Assistant Examiner—Tai V. Duong
Attorney, Agent, or Firm—Nixon & Vanderhye

[57] ABSTRACT

An optical switch, e.g. a blocking switch or a coupler switch, has a liquid crystal control element which, in at least one of its control configurations, has a splayed molecular orientation. In a preferred embodiment the liquid crystal is surrounded by chemical control surfaces, e.g. by homeotropically coated control surfaces.

17 Claims, 5 Drawing Sheets

OFF   ON

Fig. 2. (PRIOR ART)

OFF   ON

(PRIOR ART)

OPTICAL SWITCHING DEVICES HAVING LIQUID CRYSTAL WITH SPLAYED MOLECULAR ORIENTATION

This invention relates to optical switching devices and in particular to devices which switch the orientation of a liquid crystal as the primary control mechanism.

Many configurations have been proposed for optical switching devices which include one or more path regions for optical signals, said path regions being adjacent to a liquid crystal region which is comprised in the confining region of the path or in a common confining region of two or more paths. The liquid crystal is associated with electrodes and the application of control voltages actuates the device.

The mode of operation of these optical switches is as follows. The change in the electrical state of the electrodes, usually between "field on" and "field off", affects the state of the liquid crystal and in particular changes its refractive index whereby the effect of the confining region is substantially altered.

In devices with a single path region, usually called "blocking switches", the change makes the difference between confining the radiation in the path region and allowing it to escape, ie. an "on-off" switch. There are also "coupler devices" in which the liquid crystal separates two path regions and the change in refractive index makes the difference between permitting or preventing exchange of energy between the two paths.

Although many configurations have been proposed, they all share a common problem. This arises from the inherent uniaxiality of the nematic liquid crystal phase. In a uniaxial material there is only one direction in which light can propagate and all directions 'see' the same refractive index. In all other directions, different polarisations are differently affected, ie the devices are polarisation sensitive. This reduces the switch efficacy as only one polarisation can be affected at each switch. For polarisation independence, two directions are required where the input light sees the same index for all polarisations. In these two directions the index must be different from the other direction. Thus the fabrication of liquid crystal devices poses the problem of reducing the polarisation sensitivity, preferably to make an intensity difference of at least 10 dB in the switched signals.

The problem is solved by providing a liquid crystal control region such that, in at least one of its configurations, its molecules adopt a splayed configuration. For example, the molecules may be arranged in a fan configuration.

It is convenient to configure the device so that the splayed configuration is adopted when the control voltage is "off" and for the splayed configuration to correspond to the "off" state of the optical device.

The major factors necessary to understand the mode of operation of an optical switching device according to the invention include the following:

(1) Refractive Index

The molecules of the liquid crystal composition are much longer in one direction, conveniently called the molecular axis, than in other directions. If all the molecules were aligned with their molecular axes parallel, the liquid crystal would have an extraordinary refractive index; that is the refractive index would be greater in the direction of molecular orientation than in other directions.

(2) Dipole Moment

The molecules all have a dipole moment and it is the interaction of this dipole moment with an applied electric field which actuates the device. When the dipole moment is perpendicular to the molecular axis the liquid crystal is said to have negative dielectric anisotropy, conveniently abbreviated to NDA. When the dipole moment is parallel to the molecular axis the crystal has positive dielectric anisotropy, conveniently abbreviated to PDA.

(3) Electric Field

When an electric field is applied the dipole moments attempt to align themselves parallel to the field. Thus the molecules of NDA liquid crystals align their axes perpendicular to an applied field whereas the molecules of PDA liquid crystals align their axes in the same direction as the field. Since it is geometrically more convenient to orientate electrodes parallel to path regions they apply fields perpendicular to the path regions. Thus devices with NDA liquid crystals are "off" when the field is "off" and vice versa whereas devices with PDA liquid crystals are "off" when the field is "on" and vice versa.

In the "off" state it is necessary to provide a splayed orientation, ie to cause different orientations of the molecules and, therefore, PDA devices require "bent" or directionally non-uniform electric fields (which are conveniently provided by non-planar electrodes).

(4) Surface Treatments

The orientation of the molecules is also affected by chemical treatments applied to the surfaces with which the liquid crystal is in contact. Homeotropic treatment, or HT, gives a preferred orientation wherein the molecular axis is normal to the surface whereas homogenous treatment, or HG, gives a preferred orientation wherein the molecular axis is parallel to the surface. The surface treatment is critical for a liquid crystal device since the chemical forces it imposes are an essential part of the control mechanism.

The surfaces to which the treatment is applied are usually parallel to the path direction.

Thus HT treatments cause molecules to become normal to the path regions; ie an "off" configuration when the electric field is "off". Therefore HT treatment is usually used in conjunction with NDA liquid crystals. The control surface should have different orientations eg surround the liquid crystal, to provide the "splay" needed for polarisation insensitivity.

HG treatments also require the surface to be rubbed and the molecules tend to align themselves with the rubbing direction. Thus rubbing the control surface parallel to the path regions produces an "on" configuration when the field is "off". Therefore HG treatments are usually used in conjunction with PDA liquid crystals.

(Because ribbed alignments are difficult at the small scale of the devices, HT treatments with NDA materials attract most interest).

Thus the liquid crystal is affected by a combination of the forces identified in both (3) and (4) above when the electric field is applied but only by the forces described in (4) above when no field is applied. The difference in configurations under these two different circumstances provides the difference of refractive index which actuates the device. In one configuration the molecules are caused to adopt a configuration normal to the path region and in this configuration the molecules must be sufficiently splayed to avoid unacceptable polarisation sensitivity.

We have found that good polarisation insensitivity is achieved in device configurations in which the liquid crystal zone is surrounded by a peripheral wall which exerts the chemical control. For example the whole of the peripheral wall is provided with the same control treatment, eg. all homeotropic. Homeotropic treatments are convenient to apply because they merely involve dipping and drying.

The peripheral wall can be regarded as a tubular surface which contains the liquid crystal. Electrodes and optical interfaces constitute segments of the peripheral wall.

The invention is defined in the claims.

The switching efficacy at an output port is measured by the ratio of the two outputs for the two states of the switch for the same input. If the efficacy of the switch is too low detectors in the output circuit (which dectors could be at long distance) could have unacceptably high error rates. Thus it is necessary to have switching efficacies about 10 dB, preferably above 15 dB, to achieve good error rates in the switched output. While very high switching efficacies are desirable it is believed that at 30 dB (or higher) the error rate properly attributable to imperfect switching performance is negligible.

Figure 1:
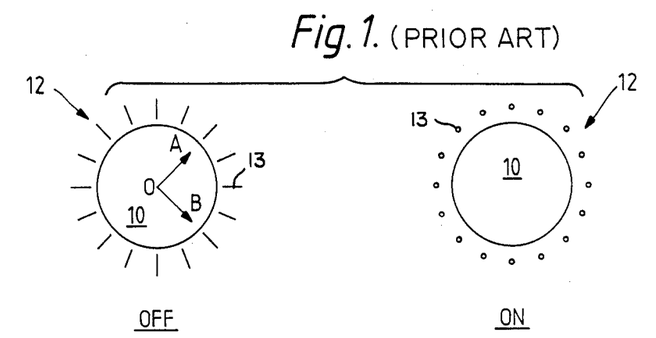
FIG. 1 shows idealised molecular orientations for giving polarisation insensitive "on" and "off" states.
Figure 2:
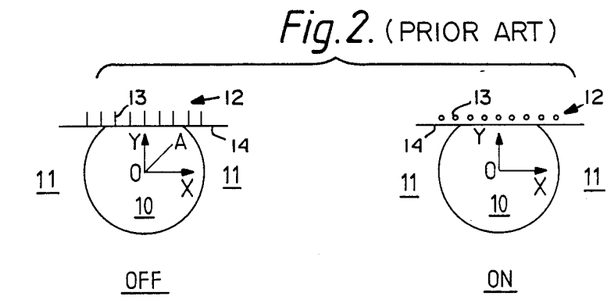
FIG. 2 shows a molecular orientation probably associated with the alleged "on" and "off" states of a conventional configuration.
Figure 3:
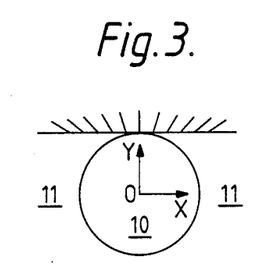
FIG. 3 shows a molecular orientation which is believed to offer an improvement to the "off" state illustrated in FIG. 2.

The invention will be further described with reference to the accompanying drawings in which FIGS. 1-3 are diagrams to assist with theoretical explanations and FIGS. 5-13 illustrate exemplary devices according to the inventions.

We wish to establish that while we believe our theoretical explanations may provide a useful insight into the mode of operation, at least until better theories are developed, we do not guarantee the theories are correct. In addition to theoretical discussion we also provide a disclosure of operational techniques which we believe to be clear enough and complete enough to enable a person skilled in the art to produce polarisation insensitive devices.

In all figures the path regions are approximately cylindrical and normal to the page. Preferrably path regions, numbered 10 in the drawings, are implemented in $SiO_2$ doped with $GeO_2$ and invariant confining regions, 11 in the drawings, are implemented in undoped $SiO_2$.

In FIGS. 2 to 13, the path region 10 is partly enclosed by an invariant confining region 11. As is conventional, the confining region includes a liquid crystal neighbourhood 12. Electrodes 13 and 15 which locate and control the liquid cyrstal neighbourhood 12 are shown in FIGS. 4 to 13 and 16.

FIG. 1 shows what would be an ideal structure if it could be achieved in practice. The path region 10 is completely surrounded by the liquid crystal 12 and in the "off" configuration all the molecules 13 are orientated radially. In the "on" configuration the molecules are orientated parallel to the direction of propagation, ie. normal to the page.

The configuration so identified in FIG. 1 is "off" because the extraordinary direction of the liquid crystal is, at all locations, normal to the direction of propagation and therefore all polarisations of radiation are controlled by the high extraordinary refractive index which gives an "off" state. In the "on" configuration all the molecules are aligned with the direction of propagation so that all polarisations of radiation are controlled by the low ordinary refractive index which gives an "on" state.

It should be noted that both "on" and "off" states are cylindrically symmetrical so all polarisations are affected by the same environment, ie. such a device would be polarisation insensitive. However, it is difficult to locate electrodes so as to control a liquid crystal which surrounds the path region 10, and, therefore other configurations need to be considered.

FIG. 2 shows a more practical configuration in which the path region 10 is partially enclosed by an invariant confining region 11 which does not participate in the switching function. The regions 10 and 11 have a flat optical interface 14 which is in contact with the liquid crystal 12.

The "on" configuration is similar to FIG. 1 in that the molecules are aligned parallel to the direction of propagation but there is an important difference in the "off" configuration because the molecules are oriented normal to the interface 14 (instead of radially).

For convenience of explanation, rectangular axes OY (normal to both optical interface 14 and the direction of propagation) and OX (parallel to interface 14 and normal to the direction of propagation) are shown in FIG. 2. In the "off" stage of FIG. 2 the molecules are all aligned in the direction OY. Thus radiation polarised in the direction OY is controlled by the extraordinary refractive index and, therefore, it passes through optical interface 14 and it is not propagated. However, radiation polarised in the direction OX is controlled by the ordinary refractive index which is selected so as to provide the "on" configuration. Thus the alleged "off" state is only "off" to some polarisations. It is suggested that there is a critical direction, shown as OA in FIG. 2, for which the effective index is equal to the critical value separating the "on" state from the "off" state. Thus polarisations in the angle AOX are "on" and only polarisations in the angle AOY are "off". It is thus proposed that, because the liquid crystal is too strongly orientated in the OY direction there cannot be both satisfactory "on" and "off" states.

FIG. 3 illustrates a mechanism which is believed to contribute to polarisation insensitivity. Instead of all the molecules being orientated in the direction OY they are splayed, ie. in a fan configuration with a variety of angles to the normal. This reduces the refractive index for polarisation in the OY direction but the value is still high enough to provide an "off" state. However, the splay also increases the refractive index in the OX direction whereby an "off" state in this direction becomes possible.

Figure 4:
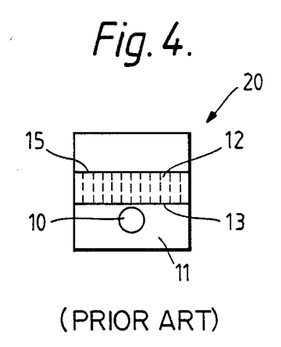
FIG. 4 is a transverse cross section illustrating a conventional liquid crystal blocking switch.

The (conventional) configuration shown in FIG. 4 comprises a half coupler block 20 having a confining region 11 and a path region 10. An electrode 13 is provided on the face of the half coupler block 20 and a liquid crystal 12 is located between electrode 13 and a second electrode 15. The surface of both electrodes are HT-treated and this treatment causes the molecules to align themselves normal to the interface surface as indicated by the dotted lines. Thus the device operates as indicated in FIG. 2 and its "off" state is unsatisfactory.

Some specific configurations of devices according to the invention will now be described.

Figure 5:
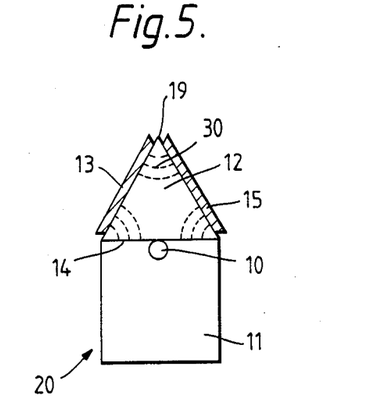
FIGS. 5-8 are transverse cross sections illustrating blocking switches according to the invention.

FIG. 5 shows a blocking switch which comprises a half-coupler block 20 having a confining region 11 and a path region 10 adjacent to an optical interference surface 14. An NDA liquid crystal region 12 is in contact with optical interface surface 14 and it has a triangular cross section. The other sides of the triangle are formed by electrodes 13 and 15 which are electrically separated by an insulating segment 19. All these surfaces, ie. both electrodes 13/15 and surfaces 14/19, were HT-treated before assembly. This provides the splayed configuration in the "off" state.

Figure 6:
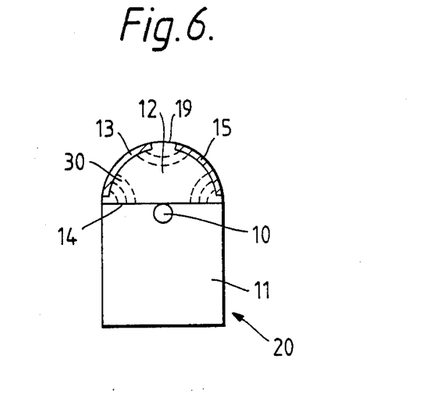

The device shown in FIG. 6 also utilises an NDA liquid crystal 12 and surfaces 13/14/15/19 were HT-treated. It provides a good "on" state when an electric field is applied across electrodes 13/15 and a good "off" state when no field is applied. Both of these states are substantially independant of the polarisation of the signals in path 10. The theory given above explains this observation as follows.

In the "off" state the molecules try to stand normally to all three surfaces because each surface has been HT-treated, the result is that the molecules of the liquid crystals try to orientate themselves along the dotted lines 30 shown in FIG. 5. This is a splayed arrangement and, therefore, the "off" state is polarisation insensitive.

When an electric field is applied to electrodes 13/15 the molecules attempt to align themselves normal to the field, ie. parallel to the path 12. However the effects of the surface treatment will still be felt and any non-alignment will be splayed whereby the "on" state is also polarisation insensitive.

There is an important difference between FIGS. 4 and 5 in that FIG. 4 has the electrodes 13/15 parallel and the chemical forces due to the surface treatment cause substantial orientation of the molecules normal to interface. This causes polarization sensitivity.

In the conventional device of FIG. 4, the electrode 13 intrudes into the optical system whereas devices according to our invention have the electrodes 13/15 located outside the optical system.

Figure 7:
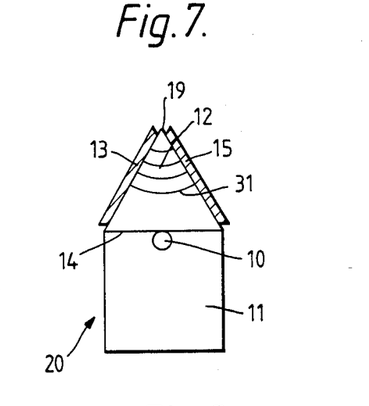
Figure 8:
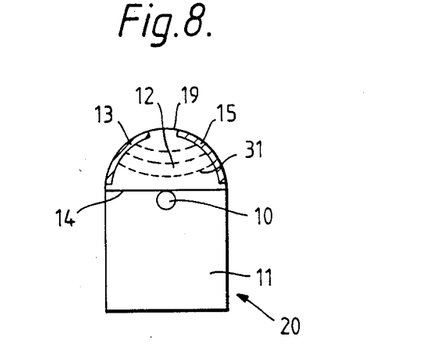

FIGS. 7 and 8 correspond to FIGS. 5 and 6 with the further differences that the surfaces 13/14/15/17 were HG treated and the liquid crystal is of the PDA type. There is also the difference that the lines 31 represent a "bent" electric field instead of chemical forces. FIGS. 7 and 8 will be discussed further below.

Figure 9:
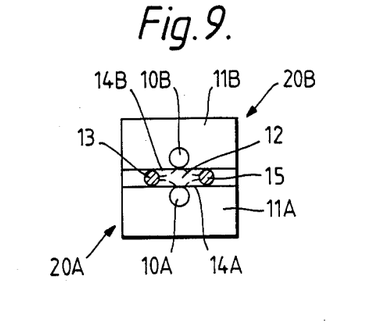
FIGS. 9 & 10 are transverse cross sections illustrating couplers according to the invention. The couplers use NDA material and HT treatments.

FIG. 9 illustrates a device which includes two half-coupler blocks 20A and 20B with two path regions 10A and 10B. The electrodes 13 and 15 take the form of conductor wires located between blocks 20A and 20B. The wires and the path regions all have similar dimensions. All the surfaces are HT-treated and this causes the molecules to adopt a splayed orientation whereby the device is polarisation insensitive.

With two paths (as shown) the device is a switchable coupler. With the electric field "on" energy will transfer from path A to path B via optical interfaces 14A/14B (or B to A if desired) but with the field "off" the energy will be confined to its own path.

Energy should be supplied into only one of the paths, ie. there is only one input, and because the device is polarisation insensitive one output path will have a very low intensity with a relatively high intensity in the other.

Figure 10:
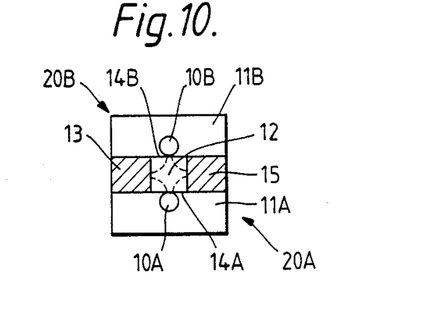

FIG. 10 is a modified version of FIG. 9 in which the liquid crystal region has a square configuration.

Figure 11:
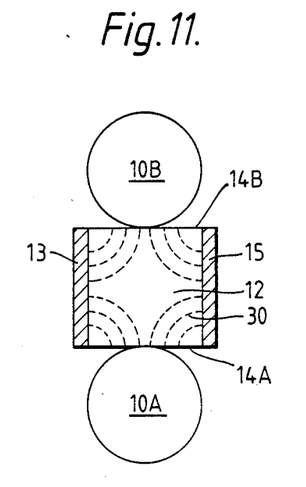
FIGS. 11-13 illustrate the operative parts of a coupler according to the invention, namely the path regions, liquid crystal and the electrodes. The couplers use NDA material and HT treatments.
Figure 12A:
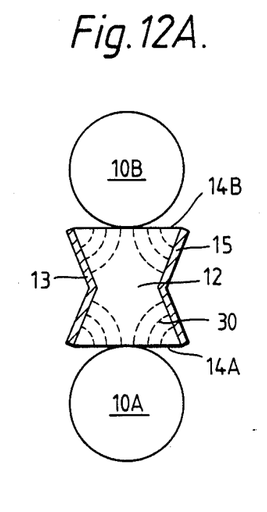
Figure 12B:
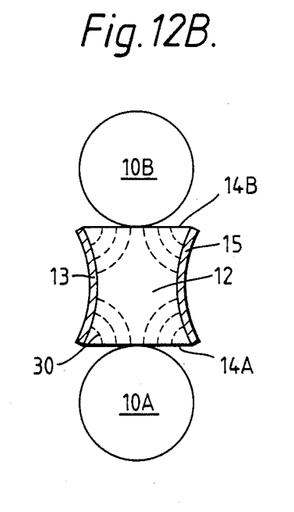
Figure 13A:
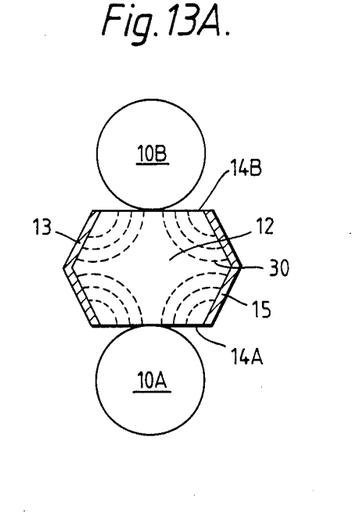
Figure 13B:
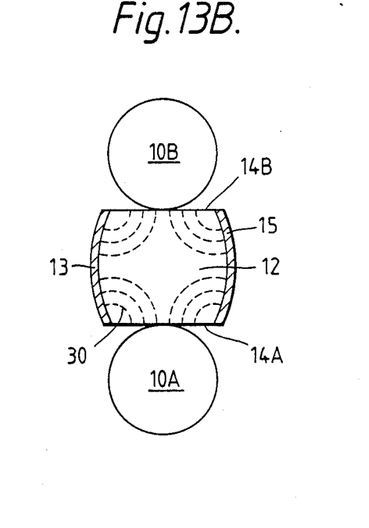

Arrangements of the liquid crystal 12 in relation to paths 10A and 10B and also electrodes 13 and 15 are shown in FIGS. 11, 12 and 13. In all these drawings the direction of molecular orientation is indicated by the dotted lines 30. FIG. 12A and 12B illustrate concave electrodes whereas FIGS. 13A and 13B illustrate convex electrodes.

There is a common feature in FIGS. 11–13 in that in its cross section normal to the paths 10A and 10B, the liquid crystal 12 is surrounded by a peripheral HT treated surface. Thus the outer layer of molecules is orientated inwards, ie. normal to the surrounding surface, and thus the splayed orientation associated with polarisation insensitivity is produced.

This surface effect only extends into the crystal volume for a short distance, eg. up to about 25 microns, so the maximum dimension for the liquid crystal region 12 is about 30 microns (diameter). Locating electrodes 13 and 15 within this distance minimises the voltages needed to operate the device. The diameter of paths 10A and 10B is usually about 8 microns (for optical reasons) and this is about the minimum size for the liquid crystal zone. The paths 10A and 10B are conventionally not more than 10 micrometres, e.g. about 1–2 mirometres behind the interfaces 14 and 14B. FIGS. 11–13 are based on these size relationships.

It should be noted that energy transfer takes place via optical interfaces 14A/14B, ie. the optical path is 10A, 14A, 12, 14B, 10B and the electrodes 13/15 do not obtrude into this path. Also any configuration suitable for use as a coupler can be used for a blocking switch by omitting (or not connecting) one of the paths.

The assembly of a device as shown in FIG. 10 (and 11) will be briefly described.

Figure 14:
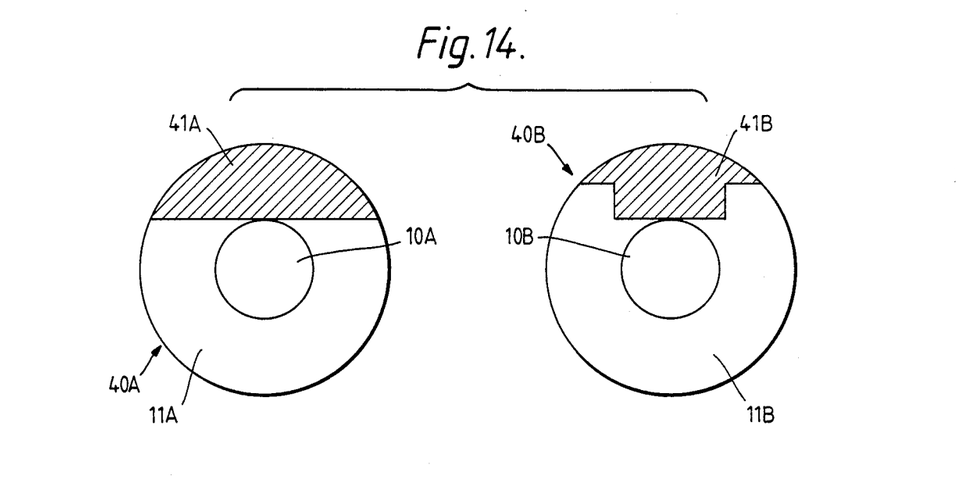
FIGS. 14-16 illustrate a way of assembling a device as shown in FIG. 10.
Figure 15:
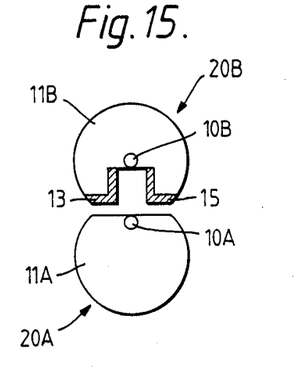

The starting point shown in FIG. 14, was two glass rods 40A and 40B, prepared by conventional inside deposition, (MCVD), with cores 10A/10B of GeO$_2$ doped silica and claddings 11a/11B of undoped silica. The shaded regions 41A/41B were ground away to give preforms for half coupler blocks 20A and 20B. As is conventional for glass fibre the preforms were drawn to reduce the cross-sectional dimension to those of the finished device and surfaces 13, 15, see FIG. 15, were metallised to give precursors of electrodes 13, 15. This drawing and metallisation converted the rod 40A and 40B into half coupler blocks.

After metallisation the two half coupler blocks were HT-treated. This comprised immersion for a few seconds in a solution of cetyl-trimethyl-ammonium bromide in isopropyl alcohol (0.1 gm per 100 mls). On removal from the solution the half coupler blocks were dried at 100° C., and cut into lengths of 1 to 10 cm. This gave a set of half coupler blocks 20A and another set of half coupler blocks 20B.

Figure 16:
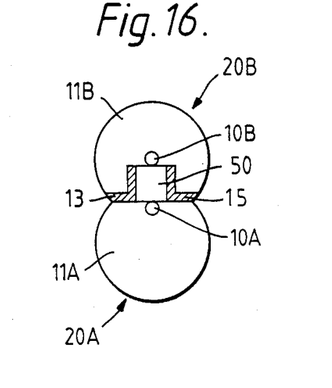

An item from each set were juxtaposed as shown in FIG. 16 and molten liquid crystal composition was allowed to wick into capilliary bore 50. The liquid crystal composition was allowed to cool giving a device as shown in FIG. 10.

The liquid crystal composition was a mixture of two compounds each with the generic formula:

$$CH_3(CH_2)_n C_6H_{10}-CO-O-C_6H_{10}(CH_2)_m CH_3$$

wherein $C_6H_{10}$ represents a cyclohexane residue in the all-trans configuration and having two substituents in the para positions.

| mole % | n | m |
| --- | --- | --- |
| 65 | 2 | 2 |
| 35 | 4 | 2 |

(This composition is described in UK Patent Application No. 8624071 filed Oct. 7, 1986: BT Patent Case A23509).

The efficacy of the switch was assessed by measuring the ratio of the intensities of output with the voltage "on" and "off". The ratio was 15 dB and this implies that all polarisations of light were switched.

Figure 17:
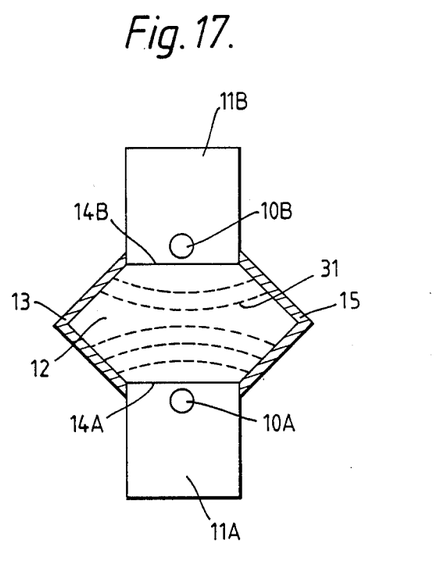
FIG. 17 illustrates a coupler according to the invention. It uses PDA material and HG treatment.

FIG. 17, in which the operative parts are arranged in a configuration similar to FIG. 13A, illustrates a device according to the invention using a PDA material as liquid crystal 12. The surfaces of the electrodes 13 and 15 and the interfaces 14A and 14B are all HG treated and rubbed parallel to the path regions 10A and 10B; in other words the rubbing was normal to the page. The dotted lines 31 indicate the direction of the electric field when the electrodes 13, 15 are charged. It is emphasized that the field lines 13 are bent because the electrodes are not planar parallel plates.

The "on" state of the device shown in FIG. 17 occurs when zero voltage is applied across electrodes 13, 15. In this state the molecules tend to orientate themselves parallel to the rubbing, ie normal to the page or parallel to the path regions 10A and 10B.

With the control voltage applied, the electric field follows the bent lines 31 and thus the orientation of the PDA material is also indicated by the dotted lines 31. In other words the orientation follows "bent" lines because the field is "bent". The field "on" is an "off" configuration and, provided that lines 31 are sufficiently "bent", the liquid crystal will be sufficiently splayed to give a polarisation independent control.

It should be noted that the curves 31 of FIG. 17 represent a "bent" electric field whereas the lines 30 in other figures represent the effect of a chemical treatment. However the operational effect is the same, namely to cause a splayed configuration of the molecules in the "off" state.

It will be apparent that the configurations shown in FIGS. 12A, 12B and 13A can also be used with PDA material and HG treated surfaces rubbed parallel to the part regions. FIGS. 7 and 8 show the electric field lines 31 when FIGS. 5 and 6 are adapted for PDA materials and HG treatments.

We claim:
1. An optical switch which comprises:
   a confining region associated with and between at least two optical path regions;
   said confining region including a liquid crystal control region which is switchable between two refractive index states for switchably coupling optical signals between said two path regions and having a splayed molecular orientation in at least one of said states so as to reduce switch sensitivity to the polarization of optical signals in said path regions.

2. An optical switch which comprises:
   a confining region associated with and between two optical path regions;
   said confining region including a liquid crystal control region which is switchable between two refractive index states for switchably coupling optical signals between said two path regions and having a splayed molecular orientation in at least one of said states so as to reduce switch sensitivity to the polarization of optical signals in said path regions.

3. An optical switch which comprises:
   a confining region associated with at least one optical path region;
   said confining region including a liquid crystal control region surrounded by and in contact with a peripheral control surface which includes electrodes for applying control fields to said liquid crystal control region;
   said peripheral control surface being adapted to exert a chemical control on the molecules of the liquid whereby said liquid crystal control region is switchable between two refractive index states, at least one of which has a splayed molecular orientation for switchably coupling optical signals between said optical path region and said liquid crystal control region without passing through said electrodes.

4. An optical switch having reduced sensitivity to the polarization of optical signals being switched and which comprises:
   a confining region associated with at least one path region for conducting optical signals;
   said confining region including a liquid crystal control region which is switchable between two refractive index states having a splayed molecular orientation in at least one of the said states thereby reducing switch sensitivity to polarization of optical signals passing in said path region;
   the liquid crystal being in contact with a peripheral control surface which, in cross sections normal to a path region, surrounds the control region;
   said control surface having a first portion adapted to exert a chemical control on the orientation of the molecules of the liquid crystal in the region associated with said path region.

5. An optical switch according to claim 4, wherein the liquid crystal peripheral control surface includes two electrodes in second and third portions for applying a control voltage to switch the control region between its two refractive index states, said second and third portions both being disposed such that the optical signal does not pass therethrough as it exits said path region during one of said states.

6. An optical switch according to claim 5, wherein all of the peripheral control surface is activated by either a homeotropic or a homogenous coating.

7. An optical switch according to 6, wherein all of the peripheral control surface has a homeotropic coating.

8. An optical switch according to claim 7 wherein the liquid crystal has negative dielectric anisotropy.

9. An optical switch which comprises:
a half coupler block having a path region, an invariant confining region and an optical interface surface adjacent the path region;
a liquid crystal control region which is switchable between two refractive index states to provide the control of the switch, said liquid crystal being in contact with the optical interface surface;
a pair of control electrodes also in contact with the liquid crystal and a second interface surface in contact with the liquid crystal to provide electrical separation between the pair of electrodes;
wherein the two electrodes, the optical interface and the second interface constitute a peripheral surface treated to control the liquid crystal so as to make its operation relatively insensitive to the polarization of light signals passing along said path region.

10. An optical switch according to claim 9, wherein the whole of the peripheral surface is homeotropically treated and the liquid crystal has negative dielectric anisotropy.

11. An optical switch which comprises:
a first half coupler block, said first half coupler block having a first half path region for conducting optical signals therealong, a first invariant confining region and a first optical interface surface adjacent the first path region for coupling optical signals to/from said first path region;
a second half coupler block, said second half coupler block having a second path region for conducting optical signals therealong, a second invariant confining region and a second optical interface surface adjacent the second path region for coupling optical signals to/from said first path region;
a liquid crystal control region which is in contact with both the first and second optical interface surfaces;
a paid of control electrodes also also in contact with the liquid crystal region, said electrodes being adapted to switch the liquid crystal control region between two refractive index states to provide control of the switch; wherein the two electrodes and the two optical interfaces constitute a peripheral surface which surrounds the said liquid crystal control region and is treated to control the liquid crystal so as to make the switch operation relatively insensitive to the polarization of light signals passing along said first and second path regions.

12. An optical switch according to claim 11, wherein the whole of the peripheral surface is homeotropically treated and the liquid crystal has negative dielectric anisotropy.

13. An optical switch which comprises:
an optical system for conveying optical signals, which optical system includes a liquid crystal region switchable between two refractive index states and in contact with one or more optical interfaces each of which is adjacent to an optical path region, and
control electrodes adapted to actuate the switch by applying a switchable electrostatic field to the liquid crystal region;
wherein the liquid crystal region has a splayed molecular orientation in at least one of its refractive index states and the electrodes are located outside the optical system such that optical signals do not pass through either of said electrodes when switched into said liquid crystal region.

14. An optical switch which comprises:
a confining region associated with at least one optical path region;
said confining region including a liquid crystal control region which is switchable between two refractive index states having a splayed molecular orientation in at least one of said states, and
electrodes for applying the actuating field to the liquid crystal region being located so as to permit the exchange of energy between an optical path region and the liquid crystal region without passage via an electrode.

15. A polarization insensitive switchable optical coupler for reliably, efficiently and controllable coupling optical signals from a first optical path to a second optical path regardless of the polarization of the optical signals in either path, said coupler comprising:
a liquid crystal medium disposed between said paths with a maximum inner-path dimension of about 30 $\mu$m for coupling optical signals between said paths;
electrodes disposed about said liquid crystal medium and disposed to produce an electric field which alters the refractive index of the medium from a first to a second state, at least one of which state causes splayed molecular alignments in the liquid crystal medium; and
said electrodes also being disposed so as not to obstruct optical signal coupling between said paths.

16. A polarization insensitive coupler as in claim 15 wherein the periphery of said liquid crystal medium includes chemical surface treatments controlling the molecular orientation of the medium at the periphery surfaces.

17. A polarization insensitive coupler as in claim 16 wherein the chemically treated surfaces lie in the path of optical signals coupled between said paths.

* * * * *